May 1, 1951     H. A. LARDY     2,550,701
MANOMETRIC APPARATUS

Filed Jan. 31, 1949     6 Sheets-Sheet 1

INVENTOR.
HENRY A. LARDY
BY Herman L. Gordon
ATTORNEY

INVENTOR.
HENRY A. LARDY
BY Herman L. Gordon
ATTORNEY

May 1, 1951

H. A. LARDY 2,550,701

MANOMETRIC APPARATUS

Filed Jan. 31, 1949

INVENTOR.
HENRY A. LARDY
BY Herman L. Gordon
ATTORNEY

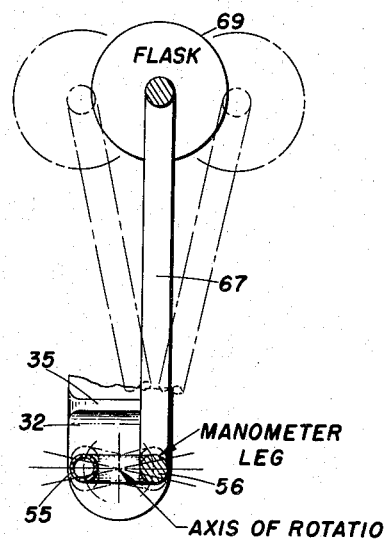
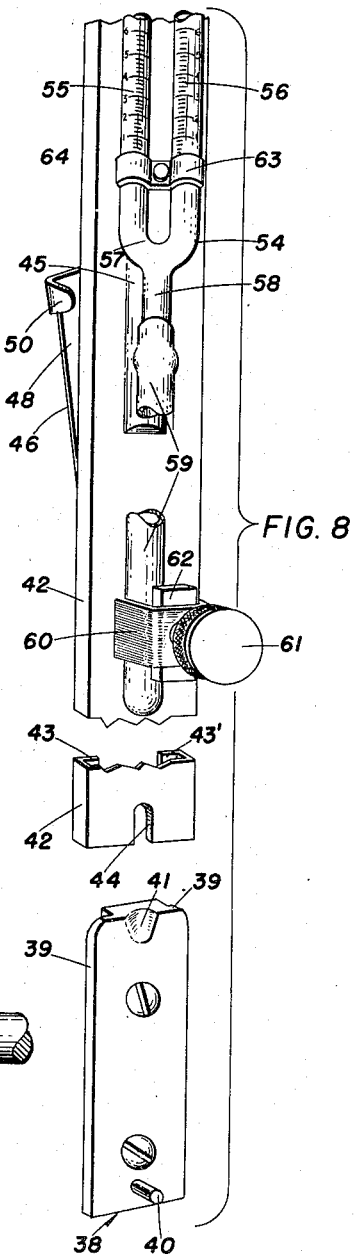
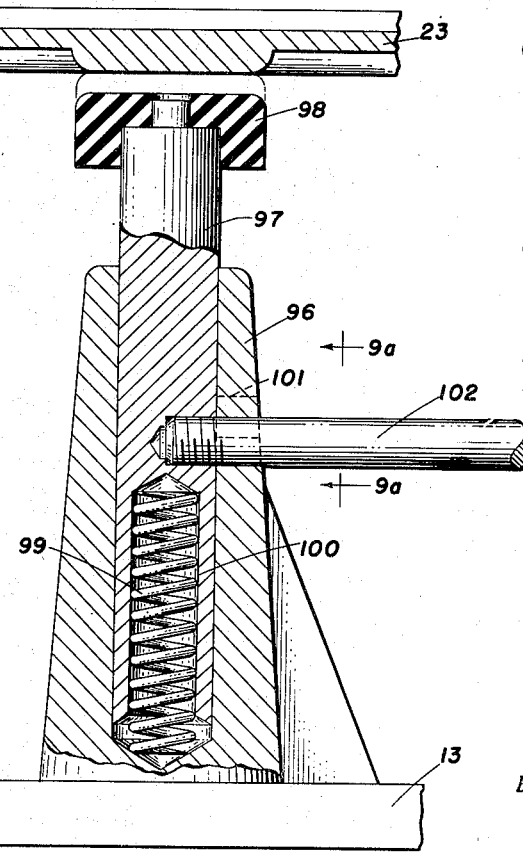

May 1, 1951    H. A. LARDY    2,550,701
MANOMETRIC APPARATUS
Filed Jan. 31, 1949    6 Sheets-Sheet 6
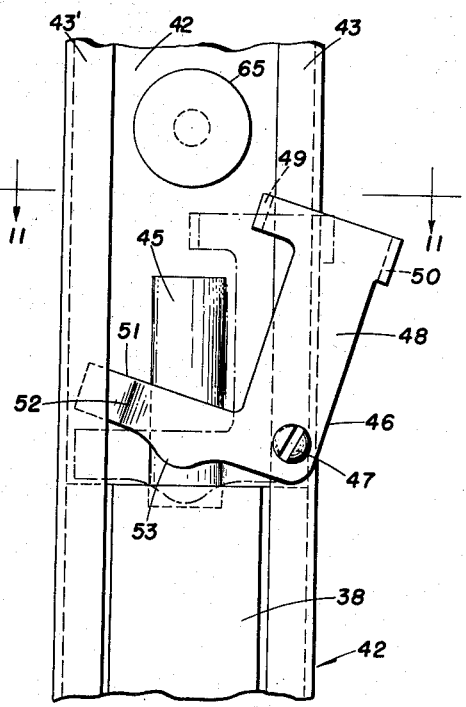
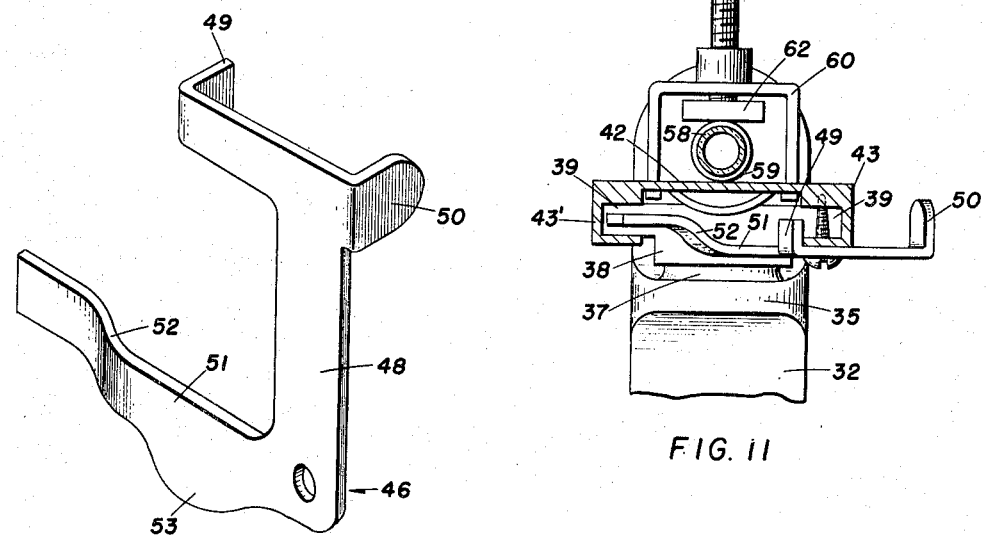
INVENTOR.
HENRY A. LARDY
BY Herman L. Gordon
ATTORNEY Patented May 1, 1951

2,550,701

UNITED STATES PATENT OFFICE 2,550,701

MANOMETRIC APPARATUS

Henry A. Lardy, Madison, Wis.

Application January 31, 1949, Serial No. 73,819

10 Claims. (Cl. 73—19)

This invention relates to manometric apparatus, and more particularly to apparatus for measuring the amount of oxygen or other gases absorbed or evolved by tissues, micro-organisms, and organic or inorganic substances as a function of time under conditions of atmospheric pressure and constant temperature.

A main object of the invention is to provide a novel and improved manometric instrument for measuring the amount of oxygen or other gases absorbed or evolved by tissues, micro-organisms, and organic or inorganic substances, which is useful as an analytical tool in dealing with biochemical, physiological, and other problems, such as the following:

1. Measurement of respiratory exchange in bacteria, yeast, cell cultures, plant and animal tissue, spores, and the like.

2. Measurement of blood gases, and for investigating the reactions of haemoglobin and other blood pigments.

3. Measurement of the reduction of methylene blue by bacteria; the study of tissue oxidations by the methylene blue method of Thunberg.

4. Measurement of lactic and pyruvic acid production by normal and tumor tissues.

5. Study of metabolism in Ringer-phosphate solution, or in those solutions which must be maintained under physiological conditions of gas tension, such as Ringer-bicarbonate solution, blood serum, and other physiological fluids.

6. Reactions in which acid or alkali is produced or consumed in bicarbonate or other solutions in equilibrium with $CO_2$ gas mixtures, by measuring the amount of $CO_2$ evolved or absorbed.

7. Microanalysis of gases with a high degree of accuracy and speed of operation, especially where the unknown gas constitutes less than 3% of the sample; any gas may be analyzed for which an absorbent may be found, the absorbent consisting of two components which are inactive until mixed. For example, determinations of $O_2$ are made by the use of acidified pyrogallol and $KOH$; and $CO_2$ is determined by the use of $KMnO_4$ and $NaI$.

8. Catalytic hydrogenations and oxidations; accelerated stability of fats; vitamin assays; photosynthesis; glycolysis.

9. In general, for the study of any reaction in which a gas is absorbed or evolved.

A further object of the invention is to provide an improved manometric apparatus for micro-respiration studies which is simple in construction, compact in size, and easy to operate.

A still further object of the invention is to provide an improved manometric apparatus employing a plurality of manometers, said manometers being readable without change of the operator's position.

A still further object of the invention is to provide an improved manometric apparatus for micro-respiration studies which utilizes a novel principle of manometer and flask motion, wherein the manometers are easily and accurately readable while in motion, wherein the manometers are securely supported, and wherein the manometers are easily mounted or removed.

A still further object of the invention is to provide an improved manometric apparatus of the type above mentioned, wherein the speed and amplitude of oscillation of the manometers and flasks are readily adjustable, wherein the temperature of the bath liquid may be closely controlled, and wherein improved uniformity of temperature of the bath liquid is obtained.

A still further object of the invention is to provide an improved apparatus for making micro-respiration studies, said apparatus enabling the amount of gas absorbed or evolved during an analysis to be determined manometrically by very simple manipulations and observations of the apparatus, the manometers being oscillated in a horizontal plane about an axis which is centered between the legs of the manometers, whereby inertia effects are balanced and whereby no fluctuations of the liquid columns in the manometers are produced as a result of the oscillations.

Further objects and advantages of the invention will become apparent from the following description and claims, and from the accompanying drawings, wherein:

Figure 7 is an enlarged cross-sectional detail view taken on line 7—7 of Figure 1, showing the paths of oscillation of the manometer legs and the flask associated with one of the manometer units, portions of the unit being omitted for the sake of clarity.

Figure 8 is a fragmentary extended detail perspective view of the lower portion of one of the manometric units and its supporting standard, as employed in the apparatus of Figure 1.

Figure 9 is an enlarged vertical cross-sectional detail view taken through the locking member for the rotary table of the apparatus of Figure 1.

Figure 9a is an enlarged fragmentary cross-sectional detail view taken on line 9a—9a of Figure 9.

Figure 10 is an enlarged elevational detail view taken on line 10—10 of Figure 4.

Figure 11 is a cross-sectional detail view taken on line 11—11 of Figure 10.

Figure 12 is an enlarged perspective detail view of the manometric unit release lever employed in the structure of Figures 10 and 11 and forming part of each manometric unit of the apparatus of Figure 1.

Figure 1:
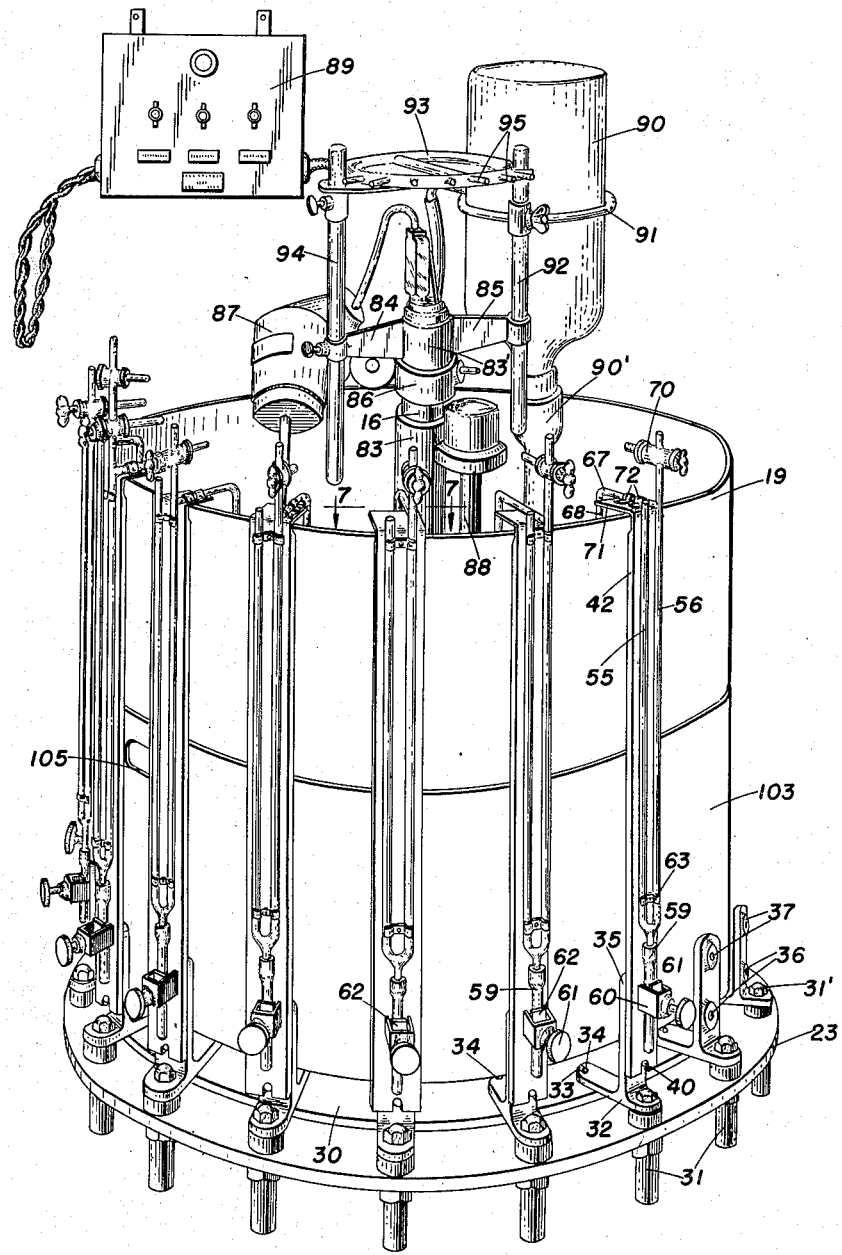
Figure 1 is a perspective view of a manometric apparatus for micro-respiration studies constructed in accordance with the present invention.
Figure 4:
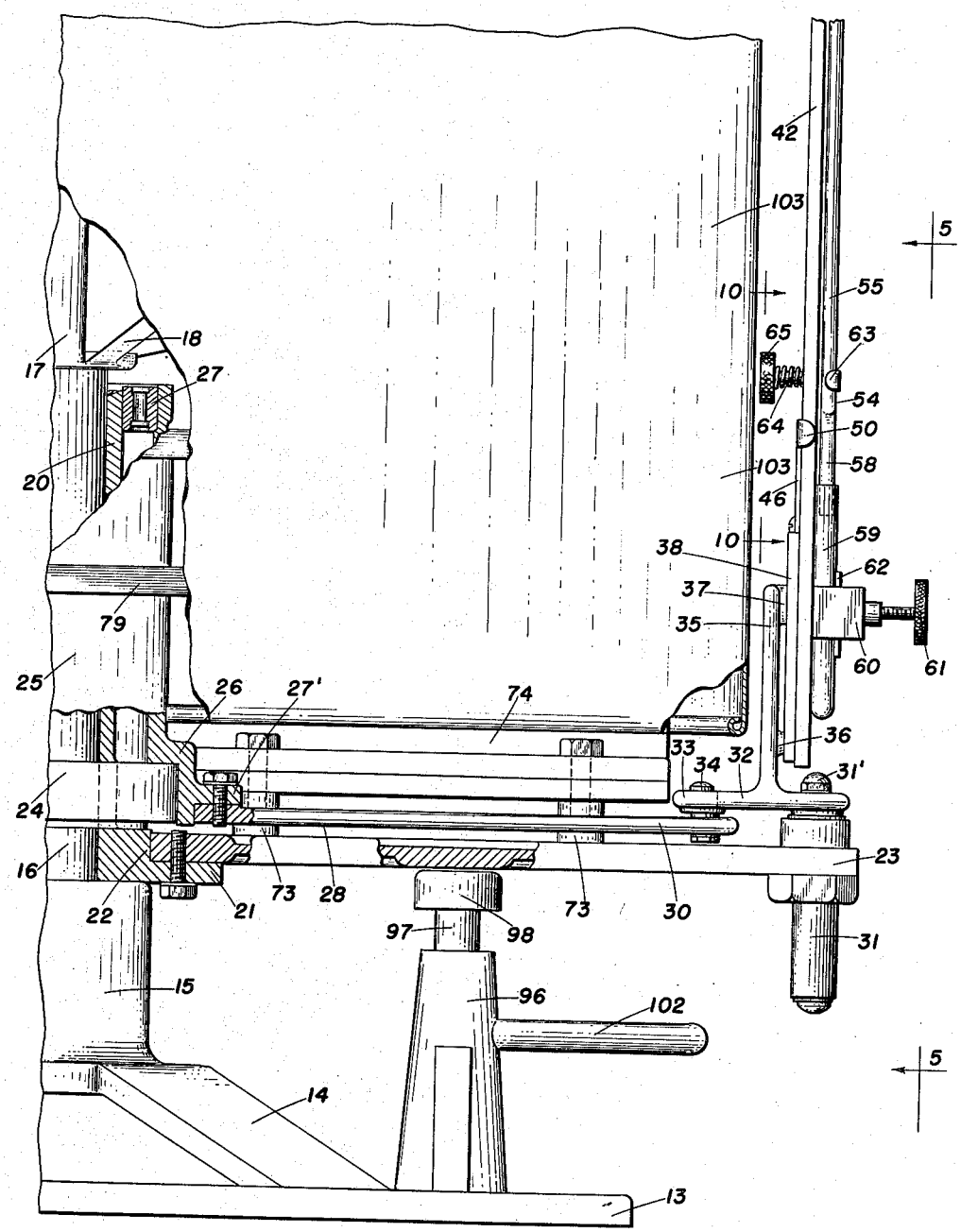
Figure 4 is an enlarged elevational detail view, partly in cross-section and with parts broken away, of the lower right side portion of the apparatus of Figure 1.
Figure 5:
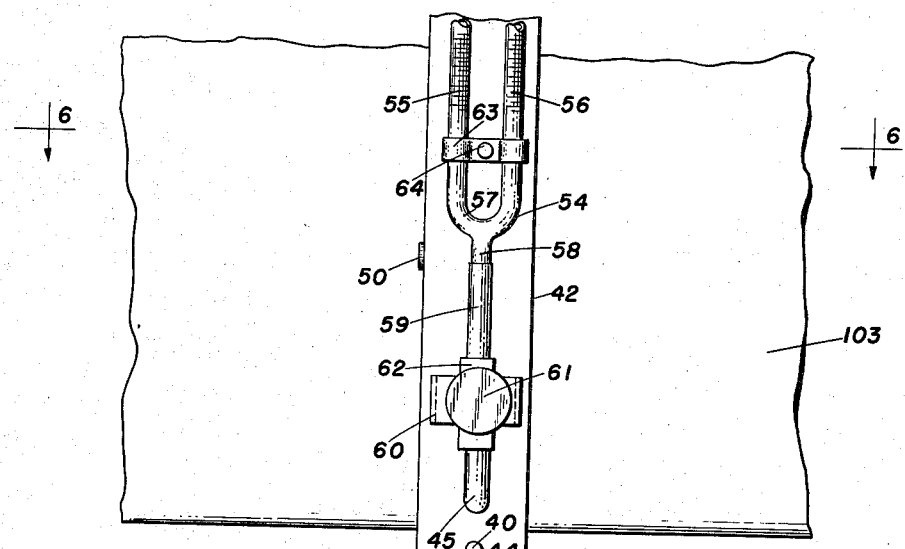
Figure 5 is an elevational detail view taken on line 5—5 of Figure 4.

Referring to the drawings, and more particularly to Figure 4, 13 designates a circular base plate formed with a plurality of inwardly and upwardly directed struts 14 which terminate in a vertical boss 15 located axially with respect to base plate 13. Secured axially in boss 15 is the vertical upstanding tubular shaft 16. Secured to the intermediate portion of shaft 16 is a casting 17 formed with radial brace arms 18. Secured to and supported on casting 17, and located coaxially with respect to base 13 is the cylindrical tank 19, said tank being formed with a central vertically rising sleeve portion 83 which surrounds the upper portion of shaft 16, as shown in Figure 1.

Rotatably surrounding shaft 16 and rotatably supported on the top surface of boss 15 is a vertical sleeve member 20, said sleeve member being formed with an annular flange 21 at its lower end, and with an annular shouldered portion 22 inwardly adjacent said flange. Secured to and supported on flange 21 is the circular table member 23. Encircling sleeve member 20 and supported on shouldered portion 22 is a combined thrust and radial bearing unit 24 of any suitable type, such as a ball bearing unit, and surrounding the sleeve member 20 is an outer sleeve 25 formed with an annular enlarged lower portion 26 which fits over and receives the outer race of bearing unit 24. A top roller bearing unit 27 is provided between the top portions of the inner sleeve member 20 and the outer sleeve member 25.

The annular enlarged lower portion 26 is formed with an annular flange 27' to which is secured the spider member 28. Spider member 28 has a plurality of radial arms 29 extending from its circular central portion. The outer ends of arms 29 merge with a circular outer ring portion 30.

Table member 23 is substantially larger in diameter than spider member 28. Secured to the marginal portion of table member 23 at equally spaced distances around the table member are a plurality of vertical bearing bushings 31. Pivotally secured for horizontal oscillation to the top end of each bearing bushing 31 by means of a headed pin member 31' received in the bushing is an inwardly extending horizontal bar 32. Secured to the ring portion 30 of spider member 28 at equally spaced distances thereon are a plurality of upstanding pin members 34, equal in number to the bearing bushings 31. Each bar 32 is formed at its end with a slot 33 which slidably receives one of the pin members 34. Each bar 32 is formed at its intermediate portion with an upstanding vertical arm 35. Each arm 35 is formed with vertically spaced outwardly directed bosses 36 and 37. Secured to each arm 35 at the bosses 36 and 37 is a vertical block member 38. As shown in Figure 8, 10 and 11, the vertical side marginal portions of the block members 38 are reduced in thickness as compared with the intermediate portions of the block members to define guide flanges 39, 39. Secured to the lower portion of each block member 38 and projecting outwardly therefrom is a pin member 40. At its upper marginal portion each block member is formed with an outwardly facing recess 41. The recess 41 and pin member 40 are located in the central vertical transverse plane of the block member.

Slidably fitting over each block member 38 is a rigid manometer supporting sleeve 42, as shown in Figures 8, 10 and 11. The sleeve 42 is formed of extruded aluminum or the like and has the side marginal channel portions 43, 43' which receive the vertical flange portions 39, 39 of the block member 38. The body portion of the sleeve 42 is formed at its lower margin with a slot 44 which receives the pin 40 of the block member 38. Said body portion is also formed with an inwardly pressed vertical bulge 45 which engages in the recess 41 of the block member and frictionally interlocks therewith, thereby rigidly securing the sleeve 42 to the supporting block 38. Referring to Figures 10, 11 and 12, it will be seen that a release lever 46 is pivotally secured at 47 to one of the rear flanges of the sleeve 42 adjacent the bulge 45. Lever 46 has an upstanding arm portion 48 formed at its top end with spaced lugs 49 and 50. Lug 49 projects inwardly of the edge of the channel portion 43 on which the lever 46 is mounted. Lug 50 projects outwardly of said channel portion and acts to limit counterclockwise rotation of the lever 46, as viewed in Figure 10, between the full line position and the dotted line position thereof, shown in the figure. Lever 46 has a laterally extending lower arm 51 which overlies the top surface of the block member 38. Arm 51 is inwardly offset at 52 so that the end of the arm is received within the channel portion 43' of the sleeve 42. The lower margin of arm 51 is formed with a depending projection 53 which engages the top surface of block member 38 when lever 46 is rotated counterclockwise from the position shown in full line view in Figure 10. By exerting a counterclockwise torque on said lever, a reactive force is developed which pushes the sleeve 42 upwardly with respect to the block member 38 and overcomes the frictional binding force between bulge 45 and recess 41, thereby enabling the sleeve to be readily lifted off the block member.

Secured in a vertical position to each sleeve 42 is a conventional manometer 54, said manometer having the usual calibrated vertical arm portions 55, 56, connected at their bottom ends by a U-bend 57, and a stem 58 depending from said U-bend. Connected to the stem 58 is the rubber reservoir 59. Secured to the sleeve 42 over the reservoir is the U-shaped bracket 60, and threaded through the bracket is the thumbscrew 61, said thumbscrew having rotatably secured to its inner end a pressure foot 62 which engages the intermediate portion of rubber reservoir 59 and normally compresses said reservoir to prevent liquid flow from the upper portion to the lower portion thereof. By loosening screw 61, liquid may be drained from stem 58 to the lower portion of reservoir 59, as required to regulate the height of liquid in the manometer arms 55 and 56.

Figure 6:
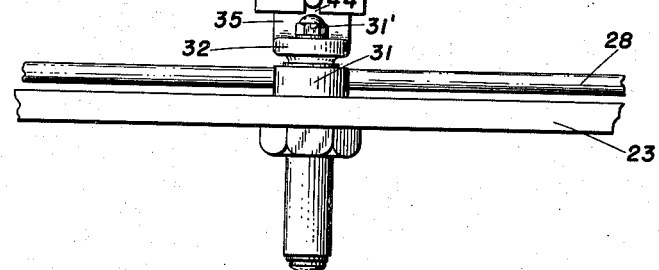
Figure 6 is an enlarged cross-sectional detail view taken on line 6—6 of Figure 5.
Figure 6:
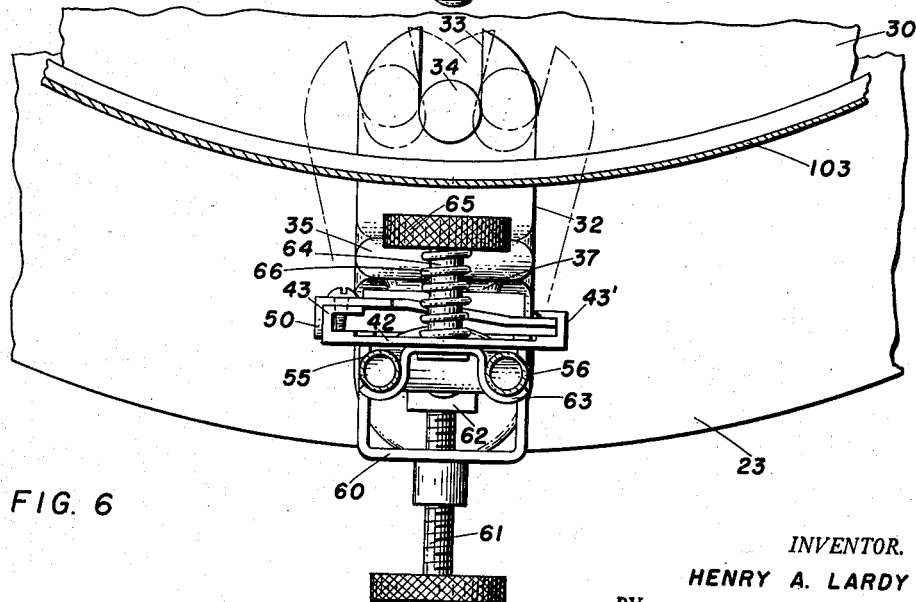

The securing means for the manometers comprises a plurality of double wing brackets 63 engaging the arms 55 and 56, as shown in Figures 4, 5, 6 and 8. Each bracket 63 is engaged at its mid portion by a flanged stud 64 which passes slidably through an aperture in the associated sleeve 42. Said mid portion fits snugly between the arms 55 and 56, as shown in Figure 6. The inner end of stud 64 has an enlarged head 65. Encircling the stud is a coiled spring 66 which bears between head 65 and the inside surface of sleeve 42, thereby exerting spring clamping pressure on the bracket 63. To release the manometers from the sleeves, the respective studs 64 are pushed outwardly, allowing the brackets 63 to be disengaged from the arms 55 and 56 and to be rotated to vertical positions, wherein they no longer engage the arms 55 and 56 when the outward pressure on studs 64 is released.

It will be noted from Figures 1, 4, 5 and 7 that the vertical axis of each manometer, i. e., the vertical axis of symmetry extending through stem 58 is the same as the vertical axis of the associated pivot bushing 31, whereby horizontal rotary movement of the manometer arms as a result of horizontal rotation of the associated bar member 32 is held to a minimum.

The top portion of each manometer arm 56 is formed with an inwardly extending branch 67 formed with a vertical depending leg 68 carrying the usual flask 69, shown in Figure 7, employed in micro-respiration studies. This flask is immersed in the liquid bath contained in tank 19, the branch 67 extending over the top rim of said tank and the leg 68 extending downwardly therein, as shown in Figure 1. The top end of the manometer arm 55 of each manometer unit is open. The top end of arm 56 is provided with the usual vent cock 70. As shown in Figure 1, each sleeve 42 has at its top end a right-angled inwardly directed flat extension 71 which underlies and supports the branch 67 of the associated manometer unit. The branch 67 may be releasably secured to the extension 71 by means of spring clips, shown at 72.

Figure 2:
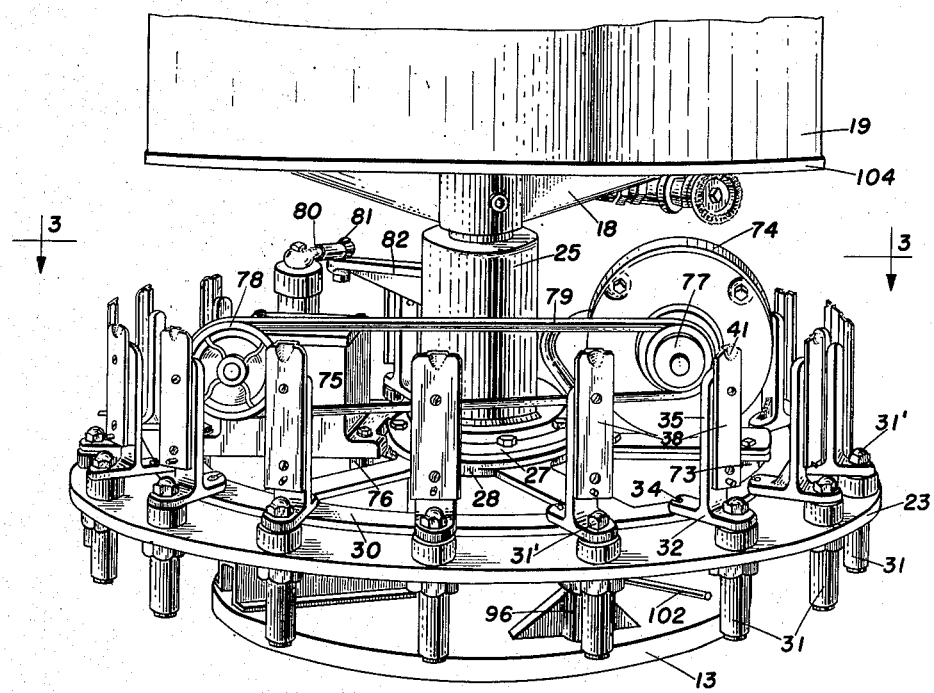
Figure 2 is a perspective view of the lower portion of the apparatus of Figure 1 with the cylindrical cover shield removed to show the internal components carried by said lower portion.
Figure 3:
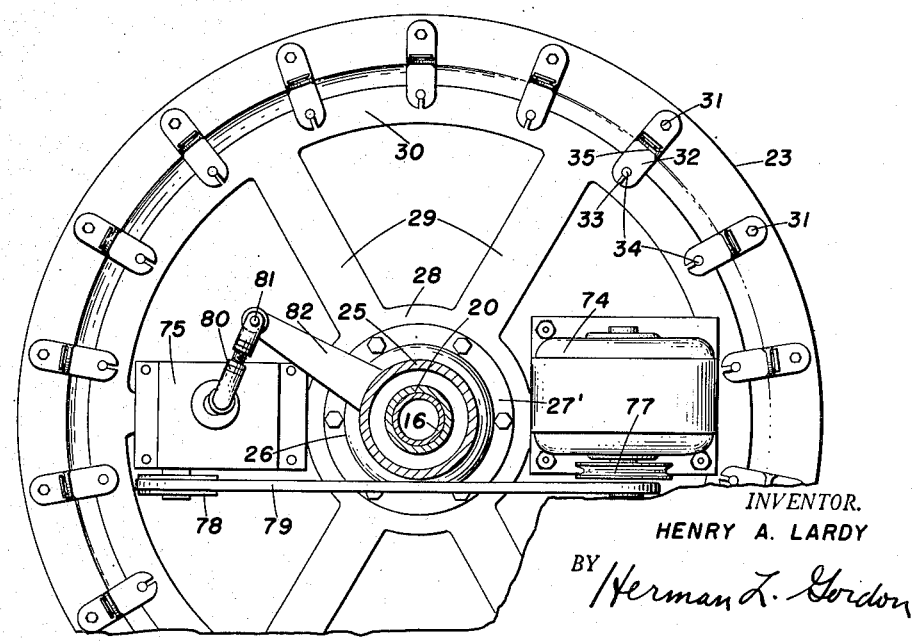
Figure 3 is a fragmentary cross-sectional view taken on line 3—3 of Figure 2.

The table member 23 is formed with upstanding bosses 73, as shown in Figure 4, and mounted thereon is an electric motor 74. Designated at 75 is a speed-reducing unit mounted on upstanding bosses 76 formed on table member 23. The shaft of motor 74 carries a three-step pulley 77. The power input shaft of the speed-reducing unit 75 carries a pulley 78. A belt 79 couples pulley 78 to a selected step of the three-step pulley 77. The speed-reducing unit 75 has an upwardly projecting vertical power output shaft which is eccentrically connected to a crank 80, said crank being adjustable in length. The end of crank 80 is pivotally connected at 81 to a radial arm 82 projecting from sleeve 25. It will be seen from Figures 2 and 3 that when motor 74 is energized, crank 80 oscillates arm 82 and sleeve 25 around the inner sleeve member 29, causing spider member 28 to be oscillated with respect to table member 23 around the axis of shaft 16 at a constant rate of oscillation and with a constant amplitude of oscillation. The pins 34 therefore act on the bars 32 to cause said bars to oscillate around their pivots at bushings 31. The rate of oscillation of bars 32 may be varied by engaging the belt 79 on different steps of the stepped pulley 77. The amplitude of oscillation of said bars may be adjusted by adjusting the length of the crank member 80. As above stated, the axis of symmetry between the calibrated arms of each of the manometer units coincides with the axis of the associated pivot bushing 31, whereby horizontal rotary movement of said arms is minimized. The flasks 69, however, are at substantial radial distances from the axes of rotation of their respective manometer units and consequently have relatively large arcuate excursions through the bath, as is readily apparent from Figure 7.

As shown in Figure 1, tubular shaft 16 rises beyond the top end of sleeve 83 and has secured to its top end a bracket 83' provided with oppositely extending arms 84, 85. Secured to shaft 16 below bracket 83' by a suitable clamp 86 is a motor-stirrer unit 87 employed for agitating the liquid in the tank. Secured to sleeve 83 by bracket means not shown is a heater device 88, having thermostatically controlled regulating means, which maintains the liquid in the bath at constant temperature. Designated at 89 is a control box which contains control switches connected in the circuits of the various electrical elements of the apparatus, whereby said elements may be individually controlled. Control box 89 may be mounted on a suitable wall surface or table adjacent the apparatus. The tubular shaft 16 is utilized as a conduit for the wiring associated with motor 74. Designated at 90 is a water bottle secured by a clamp ring 91 to a vertical rod 92 secured to the end of arm 85. Bottle 90 is held in inverted position and is provided with a depending spout 90' whose bottom end determines the level of liquid in the tank 19 and which automatically feeds liquid to the tank to compensate for evaporation, thereby maintaining the bath at a desired level.

Designated at 93 is a gassing manifold secured to a vertical rod 94 clamped to the end of arm 84. Manifold 93 may be connected to a suitable source of gas, such as oxygen or the like. The outlets of the manifold, indicated at 95, may be connected by flexible tubing to the respective manometer arms 56 for at times admitting the gas into the micro-respiration flasks 69.

Base plate 13 is integrally formed with an upwardly projecting vertical sleeve member 96 located beneath the table member 23. Slidably positioned in sleeve member 96 is a vertical plunger 97, said plunger having mounted on its top end a rubber friction shoe 98. A coiled spring 99 is positioned in an axial bore 100 formed in the lower end portion of plunger 97, said coiled spring bearing at its lower end on the bottom of the internal bore of sleeve member 96, thereby biasing plunger 97 upwardly to a position in which friction shoe 98 engages the bottom surface of table member 23 and locks it against rotation around shaft 16. Secured to plunger 97 and extending outwardly therefrom through a cam slot 101 formed in the wall of sleeve member 96 having vertically offset upper and lower portions and an inclined intermediate portion, as shown in Figure 9a, is a release arm 102. When arm 102 is moved downwardly to a depressed position in slot 101, as shown in Figure 9, plunger 97 is retracted downwardly to disengage pressure foot 98 from frictional engagement with table member 23, allowing said table member to be rotated around shaft 16 to a desired position. An operator is therefore enabled to rotate the table member so as to examine any one of the manometer units from a single position. With arm 102 in the upper portion of slot 101, the table member is locked by pressure foot 98 in a fixed position.

Slidably mounted around the cylindrical tank 19 is a cylindrical cover shell 103 which has an inwardly directed top bead cooperating with a bottom marginal rib 104 formed on tank 19 to support the shell 103 in a position covering the various components carried on table member 23 beneath the tank, such as the motor 74, speed-reducing unit 75, and the like. Shell 103 is formed with hand holes 105, enabling said shell to be manually elevated whenever access is desired to these components.

In operation, the flasks 69 are charged in the usual manner with the substances producing the reaction to be studied, such as respiring animal tissue or cell suspension, and oxygen. The arms 55 and 56 of the manometers contain suitable liquid. Before each reading, the level of the liquid in the arm 56 is always brought to the same given point by means of the release screw 61 of the manometeric unit associated therewith. The level in the open arm 55 is read. The difference in reading between arm 55 and arm 56 gives the difference of pressure between the interior of the flask of the unit and the atmosphere. From this difference in pressure the amount of gas which has been evolved or absorbed in the flask can be readily found.

For a complete discussion of various manometric methods as applied to the measurement of cell respiration and other processes, reference is made to "Manometric Methods" by Malcolm Dixon, Cambridge University Press, 1934. The present apparatus employs the well known method used extensively by O. Warburg. In the apparatus originally employed by Warburg, the manometers are shaken or rocked in a vertical plane by motor means. Due to the oscillations in the liquid in the manometer arms produced by such an action, it is necessary to stop the motor when readings are to be taken and to manually turn the manometers to vertical positions in order to avoid errors in readings due to parallax.

In the apparatus of the present invention, readings may be accurately taken without stopping the oscillations of the manometric units and without in any way altering the normal shaking action of the flasks.

While a specific embodiment of an apparatus for micro-respiration studies has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In an apparatus of the character described, a tank containing liquid, a vertical manometer adjacent said tank and having a conduit in communication therewith and rigidly connected thereto extending inwardly over the top rim of the tank and carrying a flask immersed in the liquid, said conduit communicating with said flask, and means for oscillating said manometer around its vertical axis, whereby said flask is oscillated around said axis.

2. In an apparatus of the character described, a tank containing liquid, a vertical U-shaped manometer unit adjacent said tank, one arm of the unit having a rigid extension communicating therewith and projecting over the top rim of the tank and carrying a flask immersed in the liquid, said extension communicating with said flask, and means for oscillating the manometer around the vertical axis of its U-shaped position, whereby said flask is oscillated around said axis.

3. In an apparatus of the character described, a tank containing liquid, means for maintaining the liquid at constant temperature, a vertical U-shaped manometer unit adjacent said tank, one arm of the unit having a rigid extension communicating therewith and projecting over the top rim of the tank and carrying a flask immersed in the liquid, said extension communicating with said flask, and means for oscillating the manometer at a constant rate around the vertical axis of its U-shaped portion, whereby said flask is oscillated around said axis at the same rate.

4. In an apparatus of the character described, a support, a tank mounted on said support and containing liquid, a plurality of vertical U-shaped manometer units disposed around said tank, one arm of each unit having a rigid extension communicating therewith and projecting over the top rim of the tank and carrying a flask immersed in the liquid, said flask communicating with said extension, and means for simultaneously oscillating the manometer units around the vertical axes of their respective U-shaped portions, whereby the respective flasks are oscillated around said axes.

5. An apparatus of the character described comprising a support, a tank mounted on said support and containing liquid, means for maintaining said liquid at constant temperature, a horizontal element rotatably mounted on said support for rotation in a horizontal plane, an arm pivoted to said support for horizontal rotation with respect thereto, means providing a slidable and pivotal connection between said arm and said element, an upstanding vertical manometer rigidly carried by said arm, said manometer having a rigidly connected portion communicating therewith and extending over the top rim of the tank and carrying a flask immersed in said liquid, said flask being in communication with said portion, and means for oscillating said element around its pivotal axis, whereby the flask is oscillated.

6. In an apparatus of the character described, a support, a tank mounted on said support and containing liquid, a carrier rotatably mounted on said support for rotation around a vertical axis, a plurality of vertical U-shaped manometer units movably mounted on said carrier around the tank, one arm of each unit having a rigid extension communicating therewith and projecting over the top rim of the tank and carrying a flask immersed in the liquid, said flask communicating with said extension, and means for simultaneously oscillating the manometer units around the vertical axes of their respective U-shaped portions, whereby the respective flasks are oscillated around said axes.

7. In an apparatus of the character described, a support, a cylindrical tank mounted on said support and containing liquid, a circular carrier rotatably mounted on said support for rotation around a vertical axis, a plurality of vertical U-shaped manometer units movably mounted on said carrier around the outer periphery of the tank, one arm of each unit having a rigid extension communicating therewith and projecting inwardly over the top rim of the tank and carrying a flask immersed in the liquid, said flask communicating with said extension, and means for simultaneously oscillating the manometer units around the vertical axes of their respective U-shaped portions, whereby the respective flasks are oscillated around said axes.

8. An apparatus of the character described, comprising a support, a cylindrical tank mounted on said support and containing liquid, a circular carrier member rotatably mounted on said support for rotation in a horizontal plane, a circular spider member also rotatably mounted on said support parallel to said carrier member, an arm pivoted to said carrier member for horizontal rotation with respect thereto, means providing a slidable and pivotal connection between said arm and said spider member, an upstanding vertical U-shaped manometer unit rigidly carried by said arm, one leg of said unit having a rigid extension communicating therewith and projecting over the top rim of the tank and carrying a flask immersed in the liquid, said flask communicating with said extension, and means for oscillating said spider member at a constant rate around said support, whereby said flask is oscillated at the same rate.

9. An apparatus of the character described, comprising a support, a tank mounted on said support and containing liquid, a horizontal element rotatably mounted on said support for rotation in a horizontal plane, an arm pivoted to said support for horizontal rotation with respect thereto, means providing a slidable and pivotal connection between said arm and said element, an upstanding vertical U-shaped manometer unit rigidly carried by said arm, the vertical axis of the U-shaped portion of the unit being aligned with the pivotal connection of the arm to the support, one leg of said unit having a rigid extension communicating therewith and projecting over the top rim of the tank and carrying a flask immersed in the liquid, said flask communicating with the extension, and means for oscillating said horizontal element around its pivotal axis, whereby said flask is oscillated around the vertical axis of said U-shaped portion.

10. An apparatus of the character described comprising a support, a cylindrical tank mounted on said support and containing liquid, a circular carrier member rotatably mounted on said support for rotation in a horizontal plane, a circular spider member also rotatably mounted on said support parallel to said carrier member, a plurality of inwardly extending arms respectively pivoted at spaced points to the peripheral portion of said carrier member for horizontal rotation with respect thereto, means providing a slidable and pivotal connection between the inner end of each arm and the spider member, an upstanding vertical U-shaped manometer unit rigidly carried by each arm, the vertical axis of the U-shaped portion of each unit being aligned with the pivotal connection of its associated arm with the carrier member, one leg of each unit having a rigid extension communicating therewith and projecting over the top rim of the tank and carrying a flask immersed in the liquid, said flask communicating with the extension, and means for oscillating said spider member with respect to said carrier member, whereby the respective flasks are oscillated around the vertical axes of the U-shaped portions of the respective manometer units.

HENRY A. LARDY.

REFERENCES CITED

The following references are of record in the file of this patent:

UNITED STATES PATENTS

| Number | Name | Date |
|---|---|---|
| 2,427,370 | Schweitzer | Sept. 16, 1947 |